H. E. KERR AND E. C. AHLHEIM.
ALUMINUM ROLLING PIN.
APPLICATION FILED NOV. 11, 1920. RENEWED DEC. 24, 1921.
1,405,920.
Patented Feb. 7, 1922.
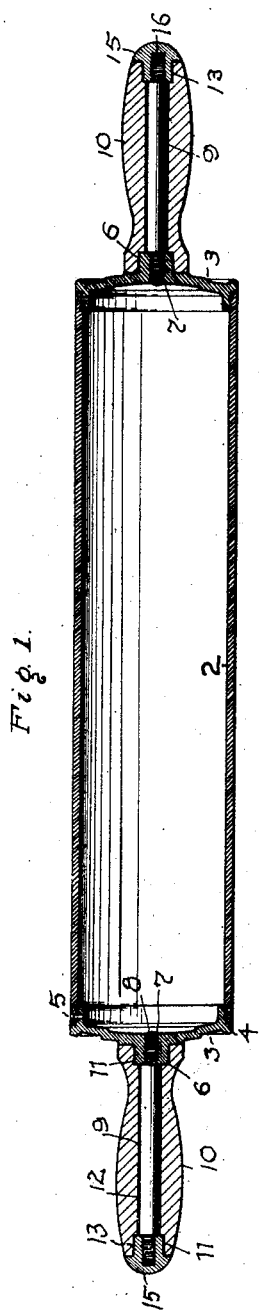
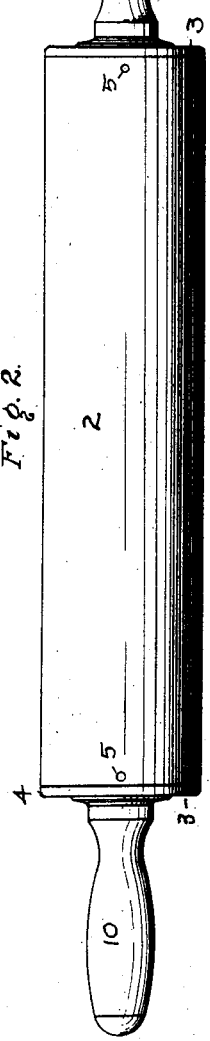
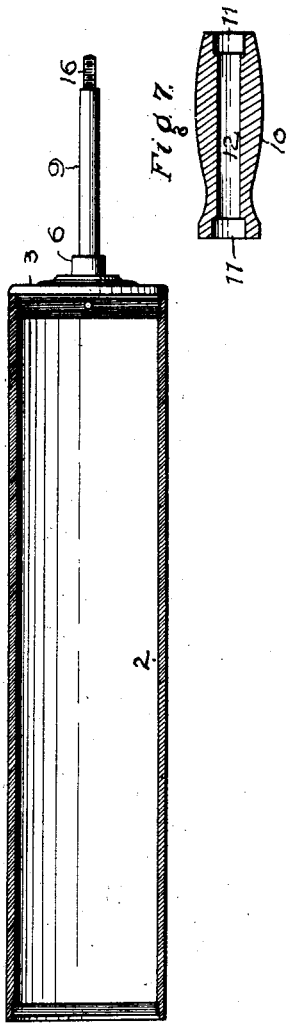
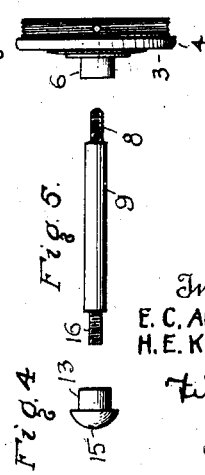
Inventors
E. C. AHLHEIM
H. E. KERR
Attorneys

UNITED STATES PATENT OFFICE.

HARRY E. KERR AND EDWARD C. AHLHEIM, OF CLEVELAND, OHIO, ASSIGNORS TO THE AHLHEIM COMPANY, OF CLEVELAND, OHIO.

ALUMINUM ROLLING PIN.

1,405,920. Specification of Letters Patent. Patented Feb. 7, 1922.

Application filed November 11, 1920, Serial No. 423,422. Renewed December 24, 1921. Serial No. 524,743.

*To all whom it may concern:*

Be it known that we, HARRY E. KERR and EDWARD C. AHLHEIM, citizens of the United States, residing at Cleveland, in the county of Cuyahoga and State of Ohio, have invented certain new and useful Improvements in an Aluminum Rolling Pin, of which the following is a specification.

This invention pertains to an improvement in an aluminum rolling pin, and our object in making the rolling pin as shown and hereinafter described is to simplify its manufacture and assembly and reduce its cost of production to a minimum, having in mind also a durable arrangement and union of parts adapted to provide smoothly finished surfaces and tightly closed joints to promote cleanliness in its domestic uses and to establish a rigid bearing for rotatable handles at opposite ends of the pin body.

In the drawing accompanying this application, Fig. 1 is a longitudinal section of my improved aluminum rolling pin, and Fig. 2 is a side elevation thereof. Fig. 3 is a sectional view of the aluminum body and a side elevation of one end cap and trunnion affixed thereto. Figs. 4, 5 and 6 are side views of the end nut, trunnion and end cap, respectively, and Fig. 7 is a sectional view of one of the handles.

The round cylindrical body of the rolling pin comprises a smooth seamless tube 2 of aluminum having internal screw-threads at its opposite ends. A dished end cap 3 of aluminum having a rounded border flange 4 of the same diameter as tube 2 is screw-engaged with each end of the tube, and when a tight joint has been effected the cap is locked in place by a small pin 5 passing through the body into the screw flange of the cap. The concavo-convex end wall of each cap 3 embodies a short round hub 6 having a central screw-threaded opening 7 adapted to receive the reduced screw-threaded end 8 of a short steel stem or trunnion 9 for the round handle 10, and each end of this handle is counterbored or provided with an enlarged recess 11 as compared with its longitudinal bore 12. Thus, when the handle is sleeved over the stem or trunnion 9 the inner counter-bore or recess 11 fits snugly and rotatably upon hub 6 and the corresponding outer counter-bore or recess fits and rotates on a round extension or boss 13 of a rounded nut 15 having a blind screw top for the outer reduced screw-threaded extension 16 of stem or trunnion 9.

The main bore 12 of handle 10 is slightly larger in diameter than trunnion 9 and therefore the handle is supported rotatably only at its ends with a minimum of frictional contact, and it rotates freely, although the end joints are relatively tight and snugly fitted to avoid accumulation of dirt. The respective closure caps, trunnions, handles and nuts at the opposite ends of the tube are constructed alike and made separable from each other and the tube, and may be easly replaced or repaired if bent or broken, and disassembly of the parts at one end may be effected without disturbing or affecting the parts at the opposite end of the tube.

What we claim, is:

1. An aluminum rolling pin, comprising a smooth aluminum tube having separate end-closure caps screw-engaged therewith, each cap having a hub and a projecting stem, a nut having a boss affixed to the outer end of each stem, and a handle rotatably supported upon the respective hubs and bosses associated with said stems.

2. An aluminum rolling pin, comprising a seamless aluminum tube, separate aluminum closure caps pinned to the opposite ends of said tube having round hubs, separate trunnion members extending from and rigidly secured to said hubs, screw nuts having round bosses engaged with the outer ends of said stems, and round handles sleeved over said stems and counterbored to rotate upon said hubs and bosses.

3. An aluminum rolling pin, comprising a seamless aluminum tube, dished and screw-threaded aluminum caps adapted to be affixed to the opposite ends of said tube, separate steel stems screw-engaged with each cap, a nut screw-engaged with the outer end of each stem, and a round handle sleeved upon each stem between a cap and nut.

4. An aluminum rolling pin, comprising an aluminum tube having separate end-closure caps affixed to the opposite ends of said tube, each cap having a hub and a projecting stem, a nut having boss affixed to the outer end of each stem, and a handle rotatably supported upon the respective hubs and bosses associated with said stems.

Signed at Cleveland, in the county of Cuyahoga, and State of Ohio, this 8 day of November, 1920.

HARRY E. KERR.
EDWARD C. AHLHEIM.